US010916134B2

(12) United States Patent
Gesch et al.

(10) Patent No.: US 10,916,134 B2
(45) Date of Patent: Feb. 9, 2021

(54) SYSTEMS AND METHODS FOR RESPONDING TO A VEHICLE PARKED ON SHOULDER OF THE ROAD

(71) Applicant: Denso International America, Inc., Southfield, MI (US)

(72) Inventors: Matthew Gesch, Northville, MI (US); Jin Kurumisawa, Aichi (JP)

(73) Assignee: Denso International America, Inc., Southfield, MI (US)

( * ) Notice: Subject to any disclaimer, the term of this patent is extended or adjusted under 35 U.S.C. 154(b) by 225 days.

(21) Appl. No.: 16/226,983

(22) Filed: Dec. 20, 2018

(65) Prior Publication Data
US 2020/0202714 A1 Jun. 25, 2020

(51) Int. Cl.
*G08G 1/0967* (2006.01)
*G05D 1/02* (2020.01)
*B60Q 9/00* (2006.01)
*B60W 50/14* (2020.01)

(52) U.S. Cl.
CPC ......... *G08G 1/096725* (2013.01); *B60Q 9/00* (2013.01); *B60W 50/14* (2013.01); *G05D 1/0212* (2013.01); *G05D 1/0276* (2013.01); *B60W 2554/00* (2020.02); *B60W 2555/60* (2020.02); *G05D 2201/0213* (2013.01)

(58) Field of Classification Search
CPC ... G08G 1/096725; B60Q 9/00; B60W 50/14; G05D 1/0212; G05D 1/0276
USPC .......................................................... 701/24
See application file for complete search history.

(56) References Cited

U.S. PATENT DOCUMENTS

| 8,977,007 | B1* | 3/2015 | Ferguson | G06K 9/00825 |
| | | | | 382/104 |
| 9,278,689 | B1* | 3/2016 | Delp | G08G 1/0965 |
| 9,557,736 | B1* | 1/2017 | Silver | G06K 9/00812 |
| 2008/0211644 | A1* | 9/2008 | Buckley | G08G 1/166 |
| | | | | 340/435 |
| 2015/0166062 | A1* | 6/2015 | Johnson | B60W 30/12 |
| | | | | 701/41 |
| 2016/0082978 | A1* | 3/2016 | Ozaki | B60W 50/14 |
| | | | | 701/58 |
| 2016/0327953 | A1* | 11/2016 | Nilsson | B60W 30/18145 |
| 2017/0008521 | A1* | 1/2017 | Braunstein | G05D 1/0287 |
| 2018/0136656 | A1* | 5/2018 | Rasmusson, Jr. .. | G01C 21/3638 |

(Continued)

*Primary Examiner* — Yazan A Soofi
(74) *Attorney, Agent, or Firm* — Christopher G. Darrow; Darrow Mustafa PC

(57) ABSTRACT

System, methods, and other embodiments described herein relate to dynamically determining an appropriate responsive action for a moving vehicle that encounters a roadside pedestrian and stationary vehicle. In one embodiment the disclosed system identifies a stationary vehicle in an environment of a subject vehicle based at least in part on information from a plurality of sensors disposed on the subject vehicle and determines a classification for the stationary vehicle as valid or abandoned based at least in part on the information from the plurality of sensors. A classification of valid indicates that the subject vehicle is recommended to undertake an action relative to the stationary vehicle. The disclosed generates a score based at least in part on the classification, the score indicating a recommended trajectory modification for the subject vehicle, and modifies a trajectory of the subject vehicle based on score.

20 Claims, 7 Drawing Sheets

(56) References Cited

U.S. PATENT DOCUMENTS

2018/0137756 A1* 5/2018 Moosaei .............. G08G 1/0965
2019/0384294 A1* 12/2019 Shashua .............. G05D 1/0088
2019/0389462 A1* 12/2019 Gesch ................ G06K 9/00791

* cited by examiner

SYSTEMS AND METHODS FOR RESPONDING TO A VEHICLE PARKED ON SHOULDER OF THE ROAD

TECHNICAL FIELD

The subject matter described herein relates to systems and methods for controlling a moving vehicle in response to identifying a stationary vehicle along a roadside, and, more particularly, to dynamically determining an appropriate responsive action for controlling a moving vehicle according to a relationship between the stationary vehicle and a pedestrian.

BACKGROUND

There are many circumstances in which pedestrians may be occupied with a task near a stationary vehicle precariously close to a roadside. Examples include ambulance workers and ambulances, law enforcement officers and their vehicles, firefighters, utility workers, municipal workers and their vehicles, and even individuals attempting to change a flat tire or check a malfunctioning engine on a privately-owned vehicle. These individuals are subjected to higher probabilities of accidents with oncoming traffic because of, for example, an inability of the oncoming traffic to sufficiently identify the pedestrians, a lack of awareness on the part of drivers of oncoming traffic, and so on. In general, pedestrians along a roadside are present in a dangerous environment with their safety being subjected to the abilities of drivers of oncoming traffic. As a result, accidents with pedestrians along a roadside and especially in proximity to stationary vehicles along the roadside are quite common.

SUMMARY

In one embodiment, example systems and methods described herein are associated with dynamically determining an appropriate responsive action for a moving vehicle approaching a stationary vehicle, and, more particularly, for a stationary vehicle at which a pedestrian is present within a proximity threshold.

Therefore, a vehicle control system for a subject vehicle is disclosed. For example, in one approach, the disclosed system identifies a stationary vehicle in an environment of the subject vehicle based at least in part on information from a plurality of sensors disposed on the subject vehicle. The disclosed system determines a classification for the stationary vehicle as valid or abandoned based at least in part on a presence of a pedestrian near the stationary vehicle. The classification of valid indicates that the subject vehicle is recommended to undertake an action relative to the stationary vehicle. The disclosed system determines a score based at least in part on the classification and modifies a trajectory of the subject vehicle based on the score.

In one embodiment, a non-transitory computer-readable medium is disclosed. The computer-readable medium stores instructions that, when executed by one or more processors, cause the one or more processors to perform the disclosed functions. The computer-readable medium includes instructions to identify a stationary vehicle in an environment of a subject vehicle based at least in part on information from a plurality of sensors disposed on the subject vehicle and determine a classification for the stationary vehicle as valid or abandoned based at least in part on a presence of a pedestrian near the stationary vehicle. The computer-readable medium further includes instructions to determine a score based at least in part on the classification of the stationary vehicle, the score indicating a recommended trajectory modification modify a trajectory of the subject vehicle based at least in part on the score In another embodiment, a method for operating a subject vehicle is disclosed. The method includes identifying a stationary vehicle in an environment of the subject vehicle based at least in part on the information from a plurality of sensors on the subject vehicle and determining a classification for the stationary vehicle as valid or abandoned based at least on a presence of a pedestrian near the subject vehicle. The method further includes determining a score based at least in part on the classification of the stationary vehicle, the score indicating a recommended trajectory modification for the subject vehicle and generating, based on the score, a control signal that indicates the classification and that causes the subject vehicle to perform one or more actions as a function of the classification.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

DETAILED DESCRIPTION

Figure 1:
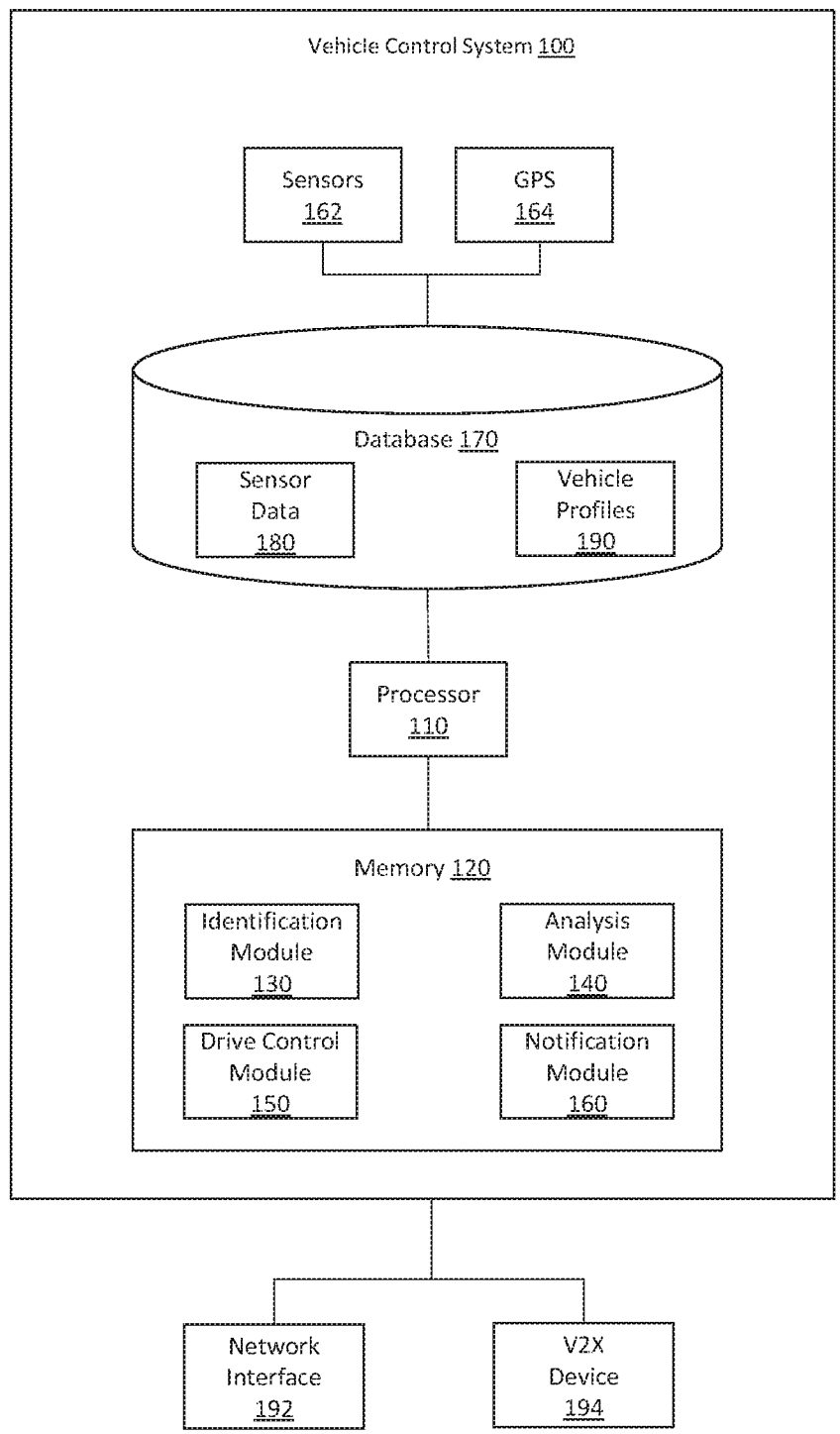
FIG. 1 illustrates one embodiment of a vehicle control system according to the disclosed subject matter.

Systems, methods and embodiments described herein are generally associated with controlling a moving vehicle in response to a stationary vehicle and to dynamically determining an appropriate responsive action for the moving vehicle upon encountering a valid vehicle with a pedestrian in the vicinity of the valid vehicle. Often a driver may be focused on the road or distracted by preparing to make a maneuver or, unfortunately, distracted by other matters such as text messages, email, social media, phone calls, music, etc. In such a state the driver may mistakenly disregard the presence of a pedestrian near a stationary vehicle on the roadside. Yet, this is a particularly dangerous position for a pedestrian to be in and full attention should be directed to the situation to ensure the safety of the pedestrian. According to the Federal Highway Administration, every year there are roughly 4,000 pedestrian fatalities and 59,000 pedestrian injuries from roadside crashes.

In addition, autonomous vehicles are becoming more prevalent. While autonomous vehicles may be generally equipped to comply with basic traffic laws such as speed limits and traffic lights, conventional systems are not equipped to dynamically respond to more nuanced situations of pedestrians near stationary vehicles on the roadside.

Therefore, in various embodiments, a vehicle control system and associated methods are disclosed herein that automatically identify stationary vehicles, determine whether the stationary vehicles are abandoned or have a pedestrian within a proximity threshold of the stationary vehicle, and either provide a notification of the situation to the driver or, in autonomous vehicles, automatically execute an appropriate safety maneuver based on the contextual circumstances. Such vehicles, near which a pedestrian is present, will be referred to herein as "valid" vehicles, in contrast with abandoned vehicles that may be found on roadsides with no pedestrian within the threshold proximity, which will be referred to as "abandoned."

As provided for in the present disclosure, the vehicle control system can operate as part of an autonomous vehicle control system or a vehicle being driven by a human driver. The vehicle control system, in one embodiment, detects a stopped vehicle and automatically classifies the stopped vehicle as being either an abandoned vehicle or valid vehicle. A valid vehicle can be, for example, a police car, an ambulance, a road maintenance vehicle, a tow truck, a privately-owned vehicle, etc., that has a pedestrian within a threshold proximity, for example, fifty feet.

In an autonomous vehicle, when the vehicle control system classifies a stopped vehicle as a valid vehicle, the vehicle control system can: 1) determine a safety score based on contextual information, 2) determine an appropriate modification to the current trajectory and speed of the autonomous vehicle based on the safety score, 3) provide a notification to a user of the autonomous vehicle indicating that the autonomous vehicle is approaching a valid vehicle and about to modify the trajectory and speed of the autonomous vehicle, and 4) execute the modification.

In a human-driven vehicle, when the vehicle control system classifies a stopped vehicle as a valid vehicle, the vehicle control system can provide the driver of the subject vehicle a notification indicating: 1) the driver is approaching a valid vehicle, and 2) provide a recommended safety maneuver. In this way, the system improves operation of the vehicle through, for example, notifications provided to the driver that reduce a risk of accident in the case of a human-driven vehicle and through automated safety maneuvers in the instance of semi-autonomous/autonomous control.

Referring to FIG. 1, one embodiment of a vehicle control system 100 is illustrated. While arrangements will be described herein with respect to the vehicle control system 100, it will be understood that embodiments are not limited to a unitary system as illustrated. In some implementations, the vehicle control system 100 may be embodied as a cloud-computing system, a cluster-computing system, a distributed computing system, a software-as-a-service (SaaS) system, and so on. Accordingly, the vehicle control system 100 is illustrated and discussed as a single device for purposes of discussion but should not be interpreted to limit the overall possible configurations in which the disclosed components may be configured. For example, the separate modules, memories, databases, and so on may be distributed among various computing systems in varying combinations.

The vehicle control system 100 also includes various elements. It will be understood that in various embodiments it may not be necessary for the vehicle control system 100 to have all of the elements shown in FIG. 1. The vehicle control system 100 can have any combination of the various elements shown in FIG. 1. Further, the vehicle control system 100 can have additional elements to those shown in FIG. 1. In some arrangements, the vehicle control system 100 may be implemented without one or more of the elements shown in FIG. 1. Further, while various elements are shown as being located within the vehicle control system 100 in FIG. 1, it will be understood that one or more of these elements can be located external to the vehicle control system 100. Further, the elements shown may be physically separated by large distances.

Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

In either case, the vehicle control system 100 is implemented to perform methods and other functions as disclosed herein relating to dynamically determining an appropriate responsive action for a moving vehicle relative to a stationary vehicle with one or more pedestrians within a proximity of the stationary vehicle. The noted functions and methods will become more apparent with a further discussion of the figures. Furthermore, the vehicle control system 100 is shown as including a processor 110. Thus, in various implementations, the processor 110 may be a part of the vehicle control system 100, the vehicle control system 100 may access the processor 110 through a data bus or another communication pathway, the processor 110 may be a remote computing resource accessible by the vehicle control system 100, and so on. In either case, the processor 110 is an electronic device such as a microprocessor, an ASIC, or another computing component that is capable of executing machine-readable instructions to produce various electronic outputs therefrom that may be used to control or cause the control of other electronic devices.

In one embodiment, the vehicle control system 100 includes a memory 120 that stores one or more of an identification module 130, a drive control module 150, and a notification module 160. The memory 120 is a random-access memory (RAM), read-only memory (ROM), a hard-disk drive, a flash memory, or other suitable memory for storing the modules 130, 140, 150 and 160. The modules 130, 140, 150 and 160 are, for example, computer-readable instructions that when executed by the processor 110 cause the processor 110 to perform the various functions disclosed herein. In various embodiments, the modules 130, 140, 150 and 160 can be implemented in different forms that can include but are not limited to hardware logic, an ASIC, components of the processor 110, instructions embedded within an electronic memory, and so on.

Figure 2:
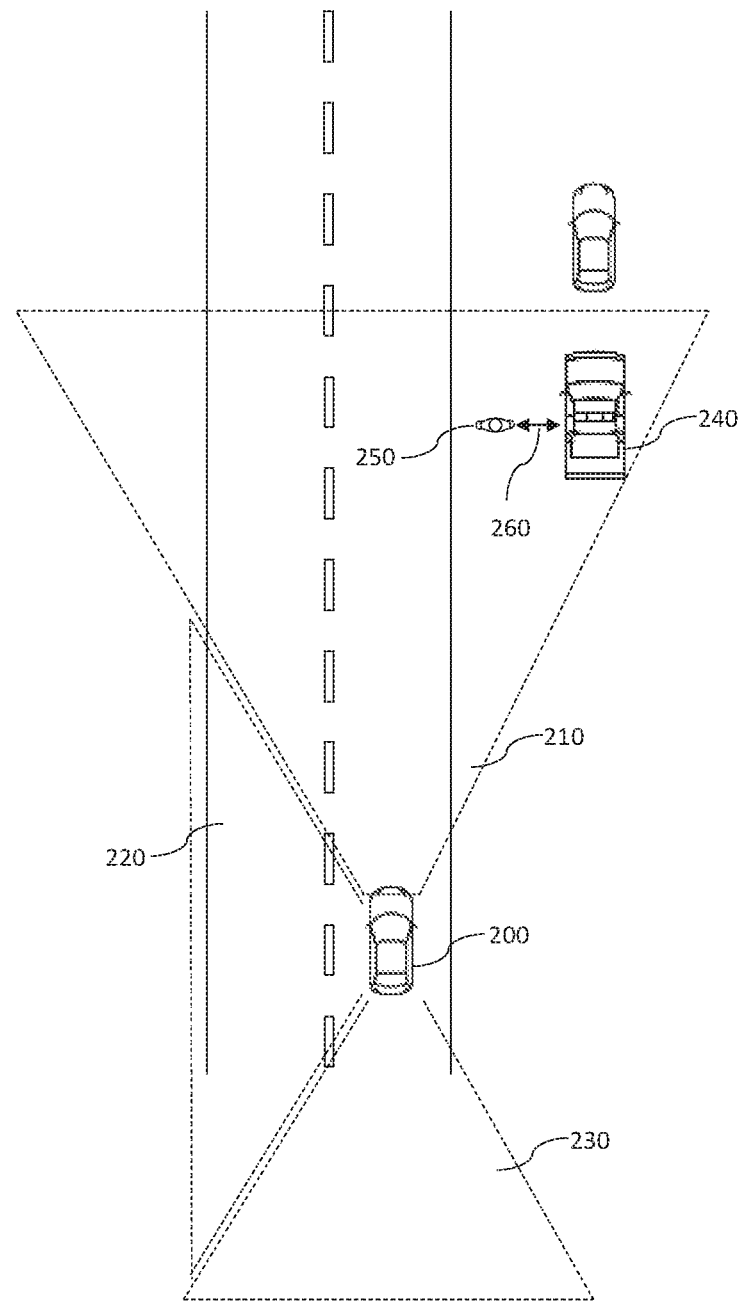
FIG. 2 illustrates an example driving scenario in which the disclosed vehicle control system can operate.

The vehicle control system 100 also includes one or more sensors 162 disposed on the subject vehicle and can include a global positioning system (GPS) 164. The sensors 162 can include, for example, a radar, camera, lidar, and/or other types of sensors that can provide information about an environment around the subject vehicle. Referring to FIG. 2, the sensors 162 can be arranged to obtain data from specific directions, such as forward-facing radar, camera, and lidar sensors to obtain data indicating what lies in a region 210 ahead of the subject vehicle, side or corner facing sensors to obtain data indicating what lies a region 220 on either side of the subject vehicle (e.g., in an adjacent lane), and rear-facing sensors to obtain data indicating what lies in a region 230 behind the subject vehicle.

Referring back to FIG. 1, the vehicle control system 100 can communicate with external systems that are separate from the subject vehicle (e.g., a cloud server, another vehicle, a mobile communication device, etc.) via a network interface 192 and/or via a vehicle-to-everything (V2X) communication device 194.

With continued reference to the vehicle control system 100, in one embodiment, the system 100 includes a database 170. The database 170 is, in one embodiment, an electronic data structure stored in the memory 120, a distributed memory, a cloud-based memory, or another data store and that is configured with routines that can be executed by the processor 110 for analyzing stored data, providing stored data, organizing stored data, and so on. Thus, in one embodiment, the database 170 stores data used by the modules 130, 140, 150 and 160 in executing various determinations. In one embodiment, the database 170 stores sensor data 180 obtained by the sensors 162 and stores vehicle profiles 190. The sensor data 180 can include, for example, digital images, radar data, and/or lidar data. The sensor data 180 can be augmented with timestamps and location data from GPS 164. As will be discussed below, the vehicle profiles 190 can include a classification and a location of stationary vehicles detected in the sensor data 180.

In one embodiment, the identification module 130 includes one or more computer-readable instructions that, when executed by the processor 110, causes the processor 110 to identify a stationary vehicle in the environment based at least in part on the information from the sensors 162 and determine a classification for the stationary vehicle as being valid or abandoned based at least in part on a presence of a pedestrian within a threshold proximity of the stationary vehicle. For example, a stopped police car (i.e., stationary vehicle) with a police officer (i.e. pedestrian) standing within fifteen feet would be classified as a valid vehicle. A stationary car parked on the side of the road with no pedestrian detected within a threshold proximity range (e.g., 100 feet) of the car would be classified as abandoned.

The identification module 130 can identify a stationary vehicle in the sensor data 180, for example, by using one or more machine learning models such as a neural network trained to identify vehicles in sensor data or clustering methods to separately distinguish objects in digital images. Using such techniques, the identification module 130 can furthermore determine whether a pedestrian is present in the area around the stationary vehicle and also identify relevant contextual information, such as guardrails, or which side of the stationary vehicle the pedestrian is located on. For example, a pedestrian can be located on a proximal side of the stationary vehicle (i.e., between the stationary vehicle and the subject vehicle) or a distal side of the stationary vehicle (i.e., the stationary vehicle is between the pedestrian and the subject vehicle).

When a pedestrian is present, the identification module 130 can include instructions to process at least some of the information from the sensors 162 to determine a lateral distance between the pedestrian and the stationary vehicle. The identification module 130 can further include instructions that determine the classification of the stationary vehicle as being valid or abandoned based at least in part on the lateral distance.

FIG. 2 shows an example driving scenario in which the disclosed vehicle control system 100 can operate. In FIG. 2, a subject vehicle 200 is approaching a stationary vehicle 240. A pedestrian 250 is standing within a vicinity of the stationary vehicle 240 on a proximal side of the stationary vehicle. Both the pedestrian 250 and the stationary vehicle are within the region 210 ahead of the subject vehicle 200 that is scanned or imaged by sensors 162 on the subject vehicle 200. The identification module 130 determines a lateral distance 260 between the pedestrian 250 and the stationary vehicle 240 and a relative position of the pedestrian 250 to the stationary vehicle 240 based on the information from the sensors 162 scanning the region 210.

Figure 3:
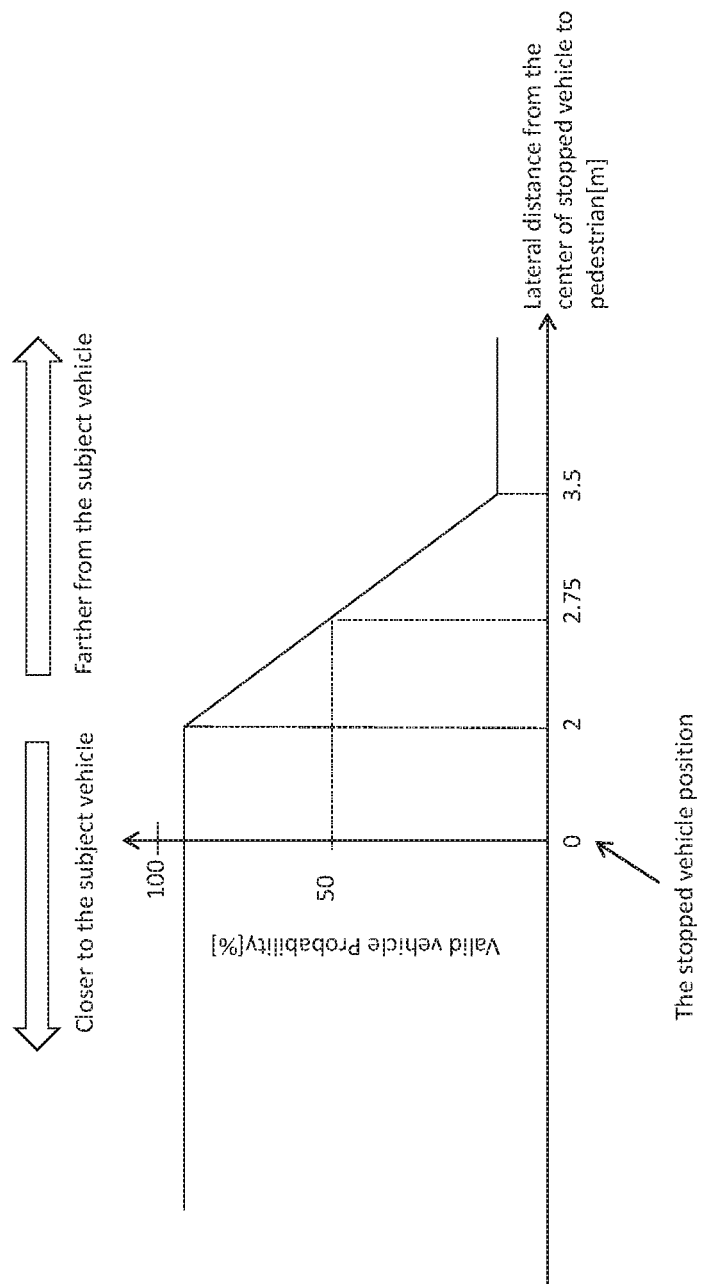
FIG. 3 illustrates an example graph demonstrating operations of an identification module according to the disclosed subject matter.

FIG. 3 shows an example graph 300 illustrating how the identification module 130 (FIG. 1) determines a valid vehicle classification probability based on the detected presence of a pedestrian and the determined lateral distance. The x-axis represents the lateral distance between the pedestrian and the stationary vehicle. The y-axis represents the probability that the stationary vehicle is a valid vehicle. When the lateral distance is below a threshold amount, for example 2.75 meters, the probability can be considered to be greater than fifty percent. In this case, 2.75 meters is effectively the threshold distance below which the identification module 130 can classify the stationary vehicle as a valid vehicle. If no pedestrian is present or the lateral distance is greater than the threshold distance, the identification module can classify the stationary vehicle as an abandoned vehicle. It should be understood that the exact values and slope of the graph can be adjusted as part of a tuning process.

The identification module 130 can include instructions to consider one or more other factors to determine which type of vehicle a stationary vehicle is. Such factors can include whether the stationary vehicle identifies itself through a wireless communication, such as V2X, or whether a cloud service includes a vehicle profile of a valid vehicle being present at the same location as the stationary vehicle. For example, the identification module 130 can send an identification request to the stationary vehicle via the V2X device 194 or send a request to a cloud service via the network interface 192, including a present location of the subject vehicle in the request, to check whether a valid vehicle has been reported to be present at the location.

Certain stationary vehicles may be equipped with a V2X device and transmit an affirmative response. For example, a police car equipped with a V2X device can transmit a response indicating that the police car is a valid vehicle involved in a traffic stop. A protocol can be adapted to allow a civilian vehicle equipped with a V2X device to similarly transmit an affirmative response, for example, when a driver of the civilian vehicle pulls over (e.g., to change a tire or check the engine) and turns on hazard lights. In these cases, even if the pedestrian is in a position that is difficult to detect from an angle of approach, for example, leaning under the hood of a car, the identification module 130 can still obtain an accurate classification.

Furthermore, the identification module 130 can check whether the database 170 already contains a stored profile 190 identifying the stationary vehicle as valid or abandoned. If no profile 190 exists, the identification module can create a profile 190 based on the determination. The profile 190 can include, for example, the type of stationary vehicle (e.g., valid or abandoned), the location of the stationary vehicle, and the time that the classification of the vehicle was made.

Due to the transient nature of roadside vehicles, the vehicle control system 100 can include instructions to cause the processor 110 to purge profiles 190 from the database 170 that have been stored for a set amount of time, for example, one day.

In addition to storing the profile 190, the identification module 130 can include instructions to transmit the profile 190 indicating the type of the stationary vehicle to an external system via the network interface 192. The external systems are separate from and external to the subject vehicle and can be, for example, a cloud-based server service, a mobile computing device, or a different vehicle.

Referring back to FIG. 1, in one embodiment the analysis module 140 includes one or more computer-readable instructions that, when executed by the processor 110, causes the processor 110 to determine a safety score based at least in part on the classification of the stationary vehicle and available contextual information. The safety score is a metric that indicates a recommended action that the subject vehicle should take given the current determined circumstances. The safety score can be determined, for example, by weighting one or more factors and compiling the factors into a single score. The factors can include the classification of the stationary vehicle (valid/abandoned) and additional contextual information, as will be discussed further below.

The recommended action can include, for example, any of a range of trajectory modifications such as slowing down, changing lanes, shifting to an edge of a lane without changing lanes, or different combinations thereof. The drive control module 150 can attempt to execute a trajectory modification based on the safety score.

Figure 4:
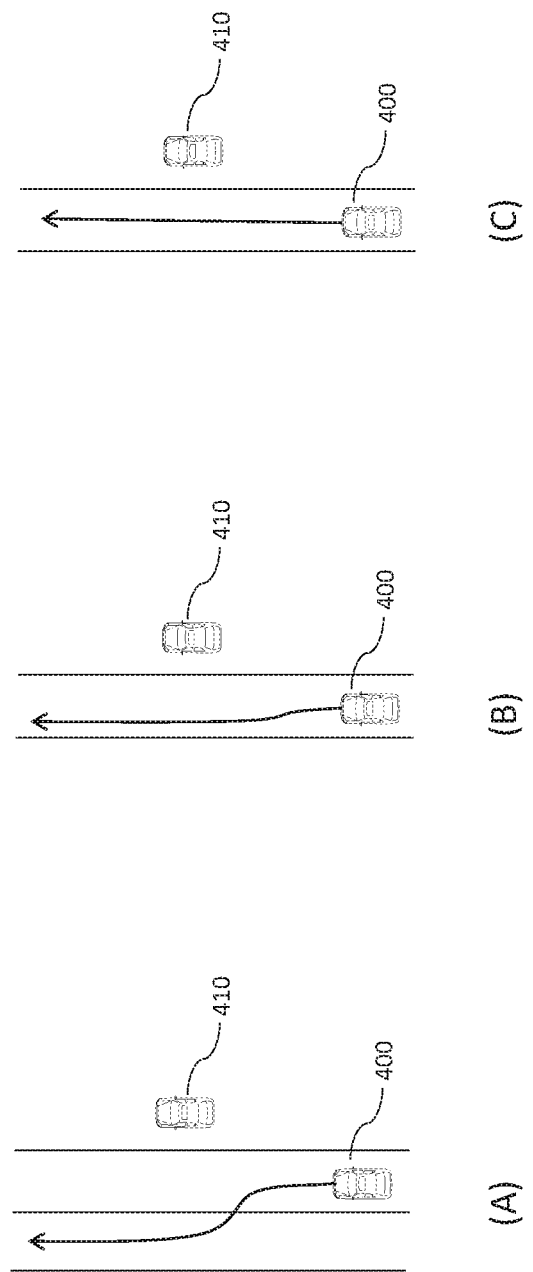
FIG. 4 illustrates example trajectory change scenarios that the disclosed vehicle control system can execute.

FIG. 4 shows examples of different possible trajectory change scenarios. When the safety score indicates a recommended trajectory modification of vacating the lane closest to a stationary vehicle and pedestrian, if safe and possible to do so, the drive control module 150 executes the trajectory change shown in scenario (A), provided no other vehicles are detected in the target region of the adjacent lane. That is, the subject vehicle 400 completes a complete lane change away from the stationary vehicle 410. This lane change can be combined with a change in speed, for example, decreasing speed by ten miles per hour.

When the safety score indicates a recommended trajectory modification of giving a wide berth to a stationary vehicle and pedestrian, or if another vehicle is in the adjacent lane beside the subject vehicle and a lane change is not a safe maneuver, the drive control module 150 can execute the trajectory change shown in scenario (B). Here, the subject vehicle 400 shifts to an edge of the current lane away from the stationary vehicle 410, but without changing lanes. This lane shift can also be combined with a change in speed, for example, decreasing speed by ten miles per hour.

In contrast, if the safety score indicates no trajectory change is necessary, the drive control module 150 will not execute any change to the current trajectory, as shown in scenario (C). That is, the subject vehicle 400 will take no lane related action relative to the stationary vehicle 410 and instead pass directly by the stationary vehicle 410.

In one embodiment, the safety score can include one or more ranges that correspond to respective trajectory modifications. In one embodiment, the safety score can comprise a scale including one or more thresholds that escalate corresponding recommended trajectory modifications in terms of evasiveness.

Figure 5:
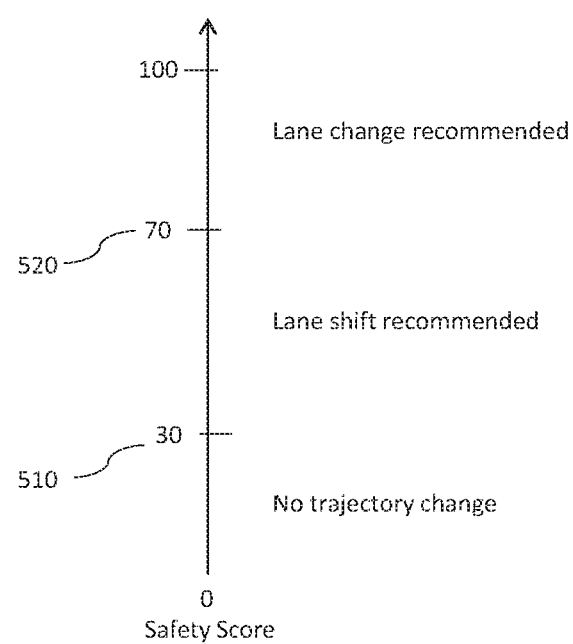
FIG. 5 illustrates an example safety score scale that an analysis module can implement according to the disclosed subject matter.

FIG. 5 shows an example safety score scale 500. The safety score scale 500 ranges from 0-100. Thresholds 510, 520 are set at scores of 30 and 70. A score below first threshold 510 (e.g., 30) indicates no trajectory modification is recommended. A score above the first threshold 510 but below the second threshold 520 indicates a lane shift trajectory modification is recommended (e.g., corresponding to FIG. 4(*b*)). A score above the second threshold 520 indicates a complete lane change is recommended (e.g., corresponding to FIG. 4(*a*)). It should be understood that the scale 500 shown in FIG. 5 is merely one example. The disclosed vehicle control system can utilize different threshold values and lesser or greater numbers of thresholds, as well as different levels of granularity in recommended actions. For example, recommended actions can include speed reductions in varying amounts, speed reductions combined with lane shifts or lane changes, or other responsive actions.

Referring again to FIG. 1, the vehicle control system 100 can include a notification module 160 including one or more instructions that, when executed by the processor 110, cause the processor 110 to provide a notification to a user of the subject vehicle regarding a detected stationary vehicle. The notification can indicate the subject vehicle is approaching a stationary vehicle, indicate the type of the stationary vehicle, and indicate a recommended trajectory modification based on the safety score. If the subject vehicle is an autonomous vehicle, the notification can further indicate that the drive control module 150 will attempt to implement the trajectory modification.

In one embodiment, the notification module 160 can generate a control signal that causes the subject vehicle to perform one or more actions based on the safety score generated by the analysis module 140. The actions can include the drive control module 150 modifying a trajectory of the subject vehicle, or simply transmitting a notification to a human driver without taking action by the drive control module 150 to maneuver the subject vehicle.

Figure 6:
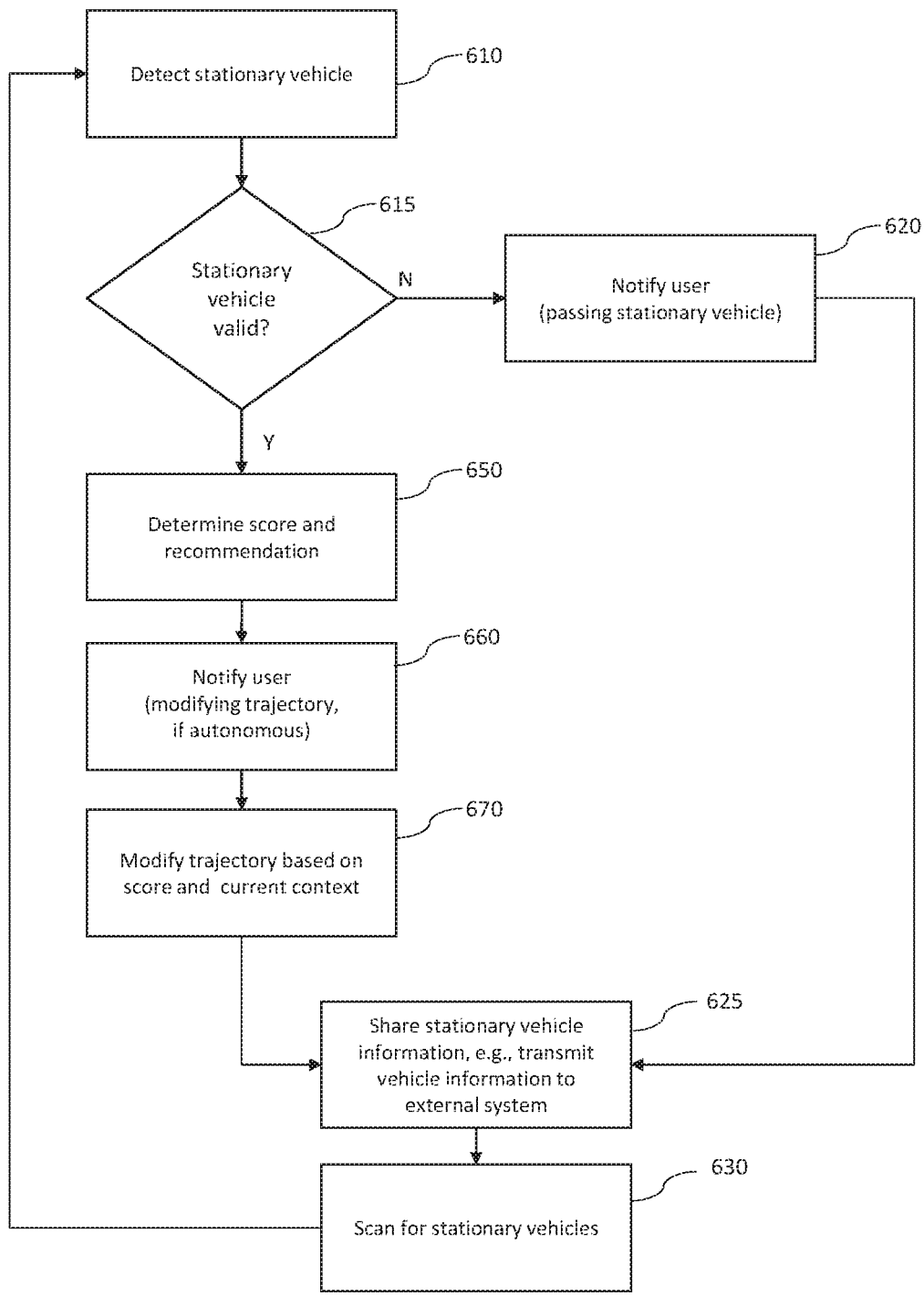
FIG. 6 illustrates a flowchart showing an embodiment of a method of operation for a vehicle control system according to the disclosed subject matter.

FIG. 6 shows a flowchart 600 of an embodiment of a method of operation for the disclosed vehicle control system 100 in an autonomous vehicle. At operation 610 the system 100 detects a stationary vehicle. At operation 615 the system 100 determines whether the stationary vehicle is a valid vehicle, for example, based on one or more of the factors discussed above. If the system 100 determines that the stationary vehicle is not a valid vehicle, then at operation 620 the system 100 transmits a notification to the user indicating that the subject vehicle is about to pass a stationary vehicle. At operation 625 the system 100, in one embodiment, shares the determination with other vehicles, for example, by transmitting a vehicle profile to a cloud-based service. In further approaches, the system 100 shares the determination upon identification of the stationary vehicle as valid and not when the stationary vehicle is abandoned. In either case, the vehicle profile can include the determined type of the stationary vehicle, the location and the time that the determination was made. At operation 630 the system scans for the next stationary vehicle.

If the stationary vehicle is determined to be valid at operation 615, then at operation 650 the vehicle control system 100 determines a safety score and corresponding trajectory modification recommendation. In one embodiment a safety score can be determined by weighting one or more factors and combining the weighting values to generate a score.

For example, a pedestrian detected on a proximal side of a stationary vehicle can be assigned a weight value of 50 while a pedestrian detected on a distal side of a stationary vehicle can be assigned a weight value of 10. That is, a pedestrian located on the roadside between the stationary vehicle and the subject vehicle can drive the safety score higher (i.e., toward a more evasive trajectory recommendation) than a pedestrian located on the opposite side of the stationary vehicle away from the road. Negative weight values can be assigned to lower the safety score. For example, a guardrail detected on the road can be assigned a weight value of −20 while lack of a guardrail can be assigned a weight value of 5. That is, the presence of a guardrail can pull the safety score lower (i.e., toward a less evasive trajectory recommendation) while the absence of a guardrail can increase the safety score.

Although several example factors are discussed here the disclosure is not limited to these examples. Other factors that can be weighted to affect the safety score can include, without limitation, a lateral distance of the pedestrian from the roadside, a posture position (e.g., crouching, standing, kneeling) of the pedestrian, the presence of multiple pedestrians, a lateral distance of the stationary vehicle from the roadside, a time of day, a weather condition, or a road condition.

At operation 660 the vehicle control system 100 transmits a notification to the user indicating the trajectory modification recommendation. In an autonomous vehicle the notification can further indicate that the subject vehicle is approaching stationary vehicle and a pedestrian, and that the system 100 is about to modify the speed/trajectory of the subject vehicle, depending up the safety score and the current environment around the subject vehicle. For example, the notification can indicate a speed modification that the system 100 is about to execute, i.e., an amount of speed reduction and a distance over which the system 100 will maintain the reduced speed, or the notification can indicate that the subject vehicle will shift trajectory to an edge of the current lane without changing lanes, or to change lanes.

At operation 670 the vehicle control system 100 executes the speed/trajectory modification. At operation 625 the system 100 shares the classification of the stationary vehicle with one or more external systems, as described above. At operation 665 the system scans for the next stationary vehicle.

Figure 7:
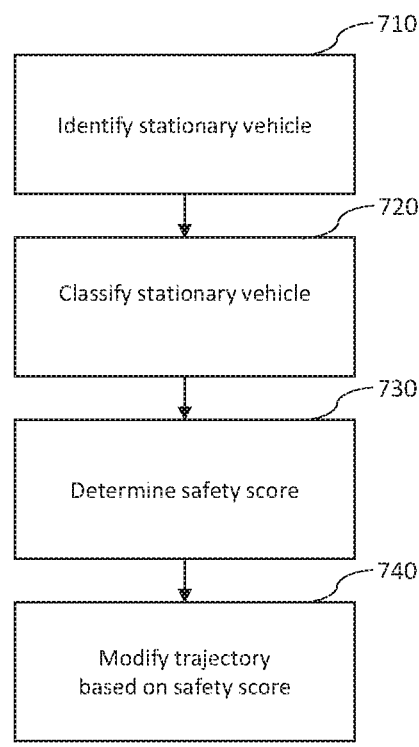
FIG. 7 illustrates a flowchart showing another embodiment of a method of operation for a vehicle control system according to the disclosed subject matter.

FIG. 7 shows a flowchart 700 for an embodiment of a general operational method of the disclosed vehicle control system. At operation 710 the system 100 identifies a stationary vehicle in an environment of the subject vehicle based at least in part on information from a plurality of sensors disposed on the subject vehicle. At operation 720 the system 100 determines a classification for the stationary vehicle as valid or abandoned, for example, based at least in part on a presence of a pedestrian near the stationary vehicle. At operation 730 the system determines a safety score, for example, based on the classification and one or more weighted factors regarding the contextual circumstances. At operation 740 the system 100 modifies a trajectory of the subject vehicle based on the safety score and the surrounding environment.

In this way, the system improves operation of the vehicle through, for example, notifications provided to the driver that reduce a risk of accident in the case of a human-driven vehicle and through automated safety maneuvers in the instance of semi-autonomous/autonomous control It should be appreciated that the vehicle control system 100 from FIG. 1 can be configured in various arrangements with separate integrated circuits and/or chips. In such embodiments, the identification module 130 from FIG. 1 can be embodied as a separate integrated circuit. Additionally, the analysis module 140, drive control module 150 and notification module 160 can each be embodied on individual integrated circuits. The circuits can be connected via connection paths to provide for communicating signals between the separate circuits. While separate integrated circuits are discussed, in various embodiments, the circuits may be integrated into a common integrated circuit board. Additionally, the integrated circuits may be combined into fewer integrated circuits or divided into more integrated circuits. In another embodiment, the modules 130, 140, 150 and 160 may be combined into a separate application-specific integrated circuit. In further embodiments, portions of the functionality associated with the modules 130, 140, 150 and 160 may be embodied as firmware executable by a processor and stored in a non-transitory memory. In still further embodiments, the modules 130, 140, 150 and 160 are integrated as hardware components of the processor 110.

In another embodiment, the described methods and/or their equivalents may be implemented with computer-executable instructions. Thus, in one embodiment, a non-transitory computer-readable medium is configured with stored computer executable instructions that when executed by a machine (e.g., processor, computer, and so on) cause the machine (and/or associated components) to perform the method.

While for purposes of simplicity of explanation, the illustrated methodologies in the figures are shown and described as a series of blocks, it is to be appreciated that the methodologies (e.g., methods 600 and 700 of FIGS. 6 and 7) are not limited by the order of the blocks, as some blocks can occur in different orders and/or concurrently with other blocks from that shown and described. Moreover, less than all the illustrated blocks may be used to implement an example methodology. Blocks may be combined or separated into multiple components. Furthermore, additional and/or alternative methodologies can employ additional blocks that are not illustrated.

The vehicle control system 100 can include one or more processors 110. In one or more arrangements, the processor(s) 110 can be a main processor of the vehicle control system 100. For instance, the processor(s) 110 can be an electronic control unit (ECU). The vehicle control system 100 can include one or more data stores for storing one or more types of data. The data stores can include volatile and/or non-volatile memory. Examples of suitable data stores include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, distributed memories, cloud-based memories, other storage medium that are suitable for storing the disclosed data, or any combination thereof. The data stores can be a component of the processor(s) 110, or the data store can be operatively connected to the processor(s) 110 for use thereby. The term "operatively connected," as used throughout this description, can include direct or indirect connections, including connections without direct physical contact.

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-7, but the embodiments are not limited to the illustrated structure or application.

The flowcharts and block diagrams in the figures illustrate the architecture, functionality, and operation of possible implementations of systems, methods, and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable medium may take forms, including, but not limited to, non-volatile media, and volatile media. Non-volatile media may include, for example, optical disks, magnetic disks, and so on. Volatile media may include, for example, semiconductor memories, dynamic memory, and so on. Examples of such a computer-readable medium may include, but are not limited to, a floppy disk, a flexible disk, a hard disk, a magnetic tape, other magnetic medium, an ASIC, a CD, other optical medium, a RAM, a ROM, a memory chip or card, a memory stick, and other media from which a computer, a processor or other electronic device can read. In the context of this document, a computer-readable storage medium may be any tangible medium that can contain, or store a program for use by or in connection with an instruction execution system, apparatus, or device.

The following includes definitions of selected terms employed herein. The definitions include various examples and/or forms of components that fall within the scope of a term and that may be used for various implementations. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

"Module," as used herein, includes a computer or electrical hardware component(s), firmware, a non-transitory computer-readable medium that stores instructions, and/or combinations of these components configured to perform a function(s) or an action(s), and/or to cause a function or action from another logic, method, and/or system. Module may include a microprocessor controlled by an algorithm, a discrete logic (e.g., ASIC), an analog circuit, a digital circuit, a programmed logic device, a memory device including instructions that when executed perform an algorithm, and so on. A module, in one or more embodiments, includes one or more CMOS gates, combinations of gates, or other circuit components. Where multiple modules are described, one or more embodiments include incorporating the multiple modules into one physical module component. Similarly, where a single module is described, one or more embodiments distribute the single module between multiple physical components.

Additionally, module as used herein includes routines, programs, objects, components, data structures, and so on that perform particular tasks or implement particular data types. In further aspects, a memory generally stores the noted modules. The memory associated with a module may be a buffer or cache embedded within a processor, a RAM, a ROM, a flash memory, or another suitable electronic storage medium. In still further aspects, a module as envisioned by the present disclosure is implemented as an application-specific integrated circuit (ASIC), a hardware component of a system on a chip (SoC), as a programmable logic array (PLA), or as another suitable hardware component that is embedded with a defined configuration set (e.g., instructions) for performing the disclosed functions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The phrase "at least one of . . . and . . . " as used herein refers to and encompasses any and all possible combinations of one or more of the associated listed items. As an example, the phrase "at least one of A, B, and C" includes A only, B only, C only, or any combination thereof (e.g., AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A vehicle control system for a subject vehicle, comprising:
    a plurality of sensors that output information describing an environment around the subject vehicle;
    a global positioning system that determines a location of the subject vehicle;
    one or more processors; and
    a memory communicably connected to the one or more processors and storing:
    an identification module including one or more instructions that, when executed by the one or more processors, cause the one or more processors to:
        i) identify a stationary vehicle in the environment based at least in part on the information from the plurality of sensors,
        ii) determine whether a pedestrian is within a threshold proximity of the stationary vehicle, and
        iii) determine a classification for the stationary vehicle as being valid or abandoned based at least in part on whether the pedestrian is within the threshold proximity of the stationary vehicle,
        wherein the classification of valid indicates that the subject vehicle is recommended to undertake an action relative to the stationary vehicle;
    an analysis module including one or more instructions that, when executed by the one or more processors, cause the one or more processors to determine a score based at least in part on the classification of the stationary vehicle, the score indicating a recommended trajectory modification for the subject vehicle; and
    a drive control module including one or more instructions that, when executed by the one or more processors, cause the one or more processors to modify a trajectory of the subject vehicle based at least in part on the score.

2. The vehicle control system of claim 1, wherein the identification module includes instructions to process at least some of the information from the plurality of sensors to determine a lateral distance between the pedestrian and the stationary vehicle, and wherein the identification module further includes instructions that determine the classification of the stationary vehicle as valid or abandoned based at least in part on the lateral distance.

3. The vehicle control system of claim 1, wherein the analysis module includes instructions to determine the score based on a plurality of weighted factors including one or more of: a lateral distance of the pedestrian from a side of a road, a posture position of the pedestrian, a presence of multiple other pedestrians, a lateral distance of the stationary vehicle from the side of the road, a time of day, a weather condition, or a road condition.

4. The vehicle control system of claim 1, wherein the analysis module includes instructions to: i) process at least some of the information from the plurality of sensors to determine a side of the stationary vehicle the pedestrian is located on, and ii) adjust the score according to the side of the stationary vehicle the pedestrian is located.

5. The vehicle control system of claim 1, wherein the analysis module includes instructions to: i) process at least some of the information from the plurality of sensors to determine whether a guardrail is disposed between the pedestrian and the subject vehicle, and ii) adjust the score based on a presence or absence of the guardrail.

6. The vehicle control system of claim 1, further comprising a notification module including one or more instructions that, when executed by the one or more processors, cause the one or more processors to provide a notification to a user of the vehicle, the notification indicating at least the classification of the stationary vehicle.

7. The vehicle control system of claim 6, wherein, the notification module includes instructions to indicate in the notification that the trajectory of the subject vehicle will be modified.

8. The vehicle control system of claim 1, further comprising a vehicle-to-everything (V2X) device to receive a communication from the stationary vehicle indicating that the stationary vehicle is valid, and the identification module includes instructions to determine the classification of the stationary vehicle based at least in part on the communication.

9. The vehicle control system of claim 1, further comprising a network interface that wirelessly communicates with one or more external systems, and the identification module includes instructions to:
    request identification of the classification of the stationary vehicle from the one or more external systems via the network interface; and
    determine the classification of the stationary vehicle based at least in part on a response to the request received via the network interface,
    wherein the one or more external systems are separate from and external to the subject vehicle.

10. The vehicle control system of claim 1, further comprising a network interface that wirelessly communicates with one or more external systems, and the identification module includes instructions to transmit data indicating the classification of the stationary vehicle to an external system via the network interface, wherein the one or more external systems are separate from and external to the subject vehicle.

11. A non-transitory computer-readable medium storing instructions for controlling a subject vehicle and that when executed by one or more processors cause the one or more processors to:
    identify a stationary vehicle in an environment of the subject vehicle based at least in part on information from a plurality of sensors disposed on the subject vehicle;
    determine a classification for the stationary vehicle as valid or abandoned based at least in part on a presence of a pedestrian near the stationary vehicle, wherein the classification of valid indicates that the subject vehicle is recommended to undertake an action relative to the stationary vehicle;

determine a score based at least in part on the classification of the stationary vehicle, the score indicating a recommended trajectory modification; and modify a trajectory of the subject vehicle based at least in part on the score.

12. The non-transitory computer-readable medium of claim 11, wherein the instructions to determine the classification of the stationary vehicle include instructions to:

process at least some of the information from the plurality of sensors to detect a presence of a pedestrian in a vicinity of the stationary vehicle;

determine a lateral distance between the pedestrian and the stationary vehicle; and determine the classification of the stationary vehicle as valid or abandoned based at least in part on the lateral distance between the pedestrian and the stationary vehicle.

13. The non-transitory computer-readable medium of claim 11, wherein the instructions to determine the score include instructions to determine the score based on a plurality of weighted factors including one or more of: a lateral distance of the pedestrian from a side of a road, a posture position of the pedestrian, a presence of multiple other pedestrians, a lateral distance of the stationary vehicle from the side of the road, a time of day, a weather condition, or a road condition.

14. The non-transitory computer-readable medium of claim 11, wherein the instructions to determine the score include instructions to: i) process at least some of the information from the plurality of sensors to determine a side of the stationary vehicle the pedestrian is located on, and ii) adjust the score according to the side of the stationary vehicle the pedestrian is located.

15. The non-transitory computer-readable medium of claim 11, wherein the instructions to determine the score include instructions to: i) process at least some of the information from the plurality of sensors to determine whether a guardrail is disposed between the pedestrian and the subject vehicle, and ii) adjust the score based on a presence or absence of the guardrail.

16. The non-transitory computer-readable medium of claim 11, wherein the instructions to control the subject vehicle further comprise instructions to provide a notification to a user of the vehicle, the notification indicating at least the classification of the stationary vehicle.

17. The non-transitory computer-readable medium of claim 16, wherein the instructions to provide the notification further include instructions to indicate in the notification that the trajectory of the subject vehicle will be modified.

18. The non-transitory computer-readable medium of claim 11, wherein the instructions to control the subject vehicle further include instructions to:

receive, via a vehicle-to-everything (V2X) device, a communication from the stationary vehicle indicating that the stationary vehicle is valid, wherein the instructions to determine the classification of the stationary vehicle includes instructions to determine the classification of the stationary vehicle based at least in part on the communication.

19. The non-transitory computer-readable medium of claim 11, wherein the instructions to identify the stationary vehicle include instructions to request identification of the classification of the stationary vehicle from an external system via a network interface, and the instructions to determine the classification determine the classification based at least in part on a response to the request received via the network interface, wherein the external system is separate from and external to the subject vehicle.

20. A method for operating a subject vehicle, comprising:

identifying a stationary vehicle in an environment of the subject vehicle based at least in part on information from a plurality of sensors on the subject vehicle;

determining a classification of the stationary vehicle as valid or abandoned based at least on a presence of a pedestrian near the subject vehicle, wherein a classification of valid indicates the subject vehicle is recommended to undertake an action relative to the stationary vehicle;

generating a score based at least in part on the classification of the stationary vehicle, the score indicating a recommended trajectory modification for the subject vehicle; and generating, based on the score, a control signal that indicates the classification and that causes the subject vehicle to perform one or more actions as a function of the classification.

* * * * *